United States Patent
Matsuzaki

(10) Patent No.: US 6,896,416 B2
(45) Date of Patent: May 24, 2005

(54) ROLLING-BEARING AND BEARING UNIT

(75) Inventor: Hiroyuki Matsuzaki, Fujisawa (JP)

(73) Assignee: NSK Limited, Tokyo (JP)

( * ) Notice: Subject to any disclaimer, the term of this patent is extended or adjusted under 35 U.S.C. 154(b) by 0 days.

(21) Appl. No.: 10/690,471

(22) Filed: Oct. 21, 2003

(65) Prior Publication Data

US 2004/0131293 A1 Jul. 8, 2004

Related U.S. Application Data

(63) Continuation of application No. 10/029,419, filed on Dec. 20, 2001, now abandoned.

(30) Foreign Application Priority Data

Dec. 20, 2000 (JP) .......................................... 2000-387233

(51) Int. Cl.[7] ................................................ F16C 33/00
(52) U.S. Cl. ........................ 384/625; 384/516; 451/901
(58) Field of Search ................................... 384/492, 513, 384/516, 625; 451/901; 29/898.066

(56) References Cited

U.S. PATENT DOCUMENTS

| | | | |
|---|---|---|---|
| 3,001,838 A | 9/1961 | Lamson et al. | |
| 3,515,599 A | 6/1970 | Connelly | |
| 4,248,485 A | 2/1981 | White et al. | |
| 5,503,481 A | * | 4/1996 | Hashimoto et al. ......... 384/569 |
| 5,723,923 A | 3/1998 | Clagett | |
| 5,878,496 A | * | 3/1999 | Liu et al. ................ 29/898.066 |
| 6,176,998 B1 | 1/2001 | Wardle et al. | |
| 6,318,898 B1 | * | 11/2001 | Ward et al. .................. 384/492 |

FOREIGN PATENT DOCUMENTS

| | | |
|---|---|---|
| JP | 62-024956 | 2/1987 |
| JP | 03-084218 | 4/1991 |
| JP | 06-173958 | 6/1994 |
| JP | 10-30643 | 2/1998 |
| JP | 2000-511267 | 8/2000 |

* cited by examiner

*Primary Examiner*—William C. Joyce
(74) *Attorney, Agent, or Firm*—Katten Muchin Zavis Rosenman

(57) ABSTRACT

A rolling bearing 10 comprises races 11, 12 having a raceway 15, 16 and rolling elements 13 having a rolling contact surface, wherein at least the raceway 15, 16 of the races 11, 12 has a machined surface, and a surface layer 11a, 12a is formed on the machined surface by electrochemically or chemically dissolving the machined surface, whereby contamination is substantially reduced.

2 Claims, 4 Drawing Sheets

ROLLING-BEARING AND BEARING UNIT

CROSS REFERENCE TO RELATED APPLICATIONS

This is a continuation of U.S. application Ser. No. 10/029,419 filed Dec. 20, 2001 now abandoned.

FIELD OF THE INVENTION

This invention relates to a rolling-bearing and a bearing unit that are used in fields such as information-processing equipment, aerospace, airplane and semiconductors.

DESCRIPTION OF THE RELATED ART

In order to improve resistance to wear, and reduce the generation of dust particles of a rolling bearing, the following methods have been proposed as methods for surface finishing of the raceway surfaces.

Japanese patent publication No. Toku Kai Sho 62-24956 proposes a method of using lapping tape coated with cubic boron nitride (CBN) abrasive grain to lap the raceway groove (raceway surface).

Japanese patent publication No. Toku Kai Hei 3-84218 proposes a method of finish-grinding the circumferential seal groove of the races simultaneously when finish-grinding the inner-raceway surface and outer-raceway surface, using the same grinding abrasive.

Recently, rolling bearings having very high resistance to wear, low generation of dust particles, good resistance to damage, and good acoustical characteristics, as well a having low degradation due to vibration and little change in torque are desired. For example, having low generation of dust particles (reduction of contamination) in rolling bearings that are used in information-processing devices such as hard disc drives (HDD), or in aerospace devices such as artificial satellites, is in great demand. Development of rolling bearings that will satisfy this strict demand is desired.

Conventionally, it has been possible to reduce contamination by washing in the assembly process after surface finishing, however, it is difficult to reduce contamination any further using just this method.

It is thought that by improving finished surfaces, such as the raceway surfaces, it is possible to further reduce contamination. However, in the surface finishing method described in Japanese patent publication No. Toku Kai Sho 62-24956, finishing is performed by machining, so it is difficult to remove very small burrs from the machined surfaces, and it is difficult to remove remaining abrasive, particularly sticked thorn-like abrasive. Further, it is difficult to remove minute burrs even by performing supersonic washing for a long period of time.

The surface finishing method described in Japanese patent publication No. Toku Kai Hei 3-84218 is effective in removing large burrs and sludge, however, since finishing is performed by machining, it is difficult to remove remaining abrasive, particularly sticked thorn-like abrasive.

SUMMARY OF THE INVENTION

In consideration of the problems described above, it is an object of this invention to provide a rolling bearing in which contamination is greatly reduced.

DESCRIPTION OF THE PREFERRED EMBODIMENTS

Figure 1:
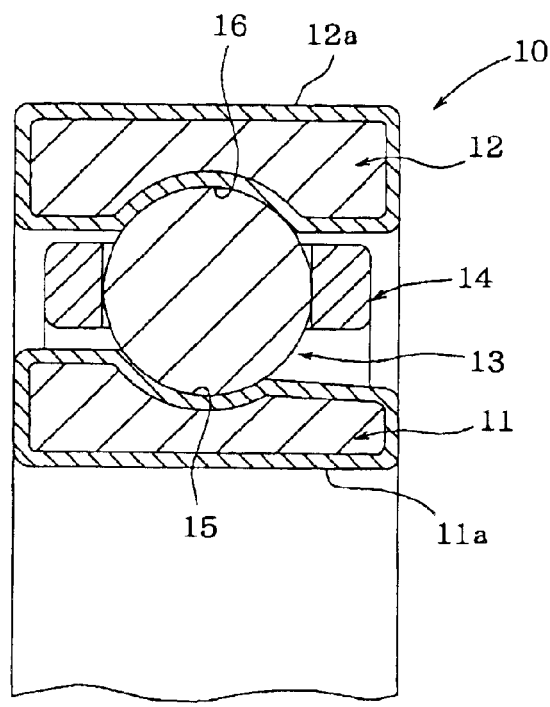
FIG. 1 is a cross sectional view to show part of a bearing in a first embodiment of the present invention.

The rolling bearing of this invention comprises races having a raceway and rolling elements having a rolling contact surface; and a surface layer is formed on at least the raceway of the races by machining at least the surface of raceway and dissolving the machined surface electrochemically or chemically to form the surface layer.

Electrolytic polishing, chemical polishing, composite electrolytic polishing or composite chemical polishing can be given as examples of the method of electrochemically or chemically dissolving the machined surface.

In this invention, it is preferable that the machined surface be super-finished before performing electrochemical or chemical processing.

Also, in this invention the surface layer is formed by electrochemically or chemically dissolving the machined surface of at least the raceway of the races. Particularly, by forming surface layers over the entire races by machining the entire races and then electrochemically or chemically dissolving the machined surfaces, contamination is removed, and thus it is possible to further improve the reduction of contamination.

Instead of using mechanical means, this invention removes contamination by electrochemically or chemically dissolving minute particles (contamination) such as abrasive that remains on the machined surfaces of the races. By performing electrochemical or chemical processing in this way, it is possible to remove any unevenness of the machined race surfaces and create surfaces with very little roughness. It is difficult for minute particles to adhere to surfaces with little roughness, so it is possible to easily remove by washing any adhering minute particles. This also makes it possible to do away with any minute particles from being brought inside the bearing during bearing assembly.

When this invention is applied to a method of manufacturing a rolling bearing comprising races having a raceway, and rolling elements having a rolling contact surface, for example, it is possible to perform grinding and then super-finishing on the surface of the raceway, then form the surface layer on at least the raceway of the races by electrochemically or chemically dissolving the machined surface, and then wash the races before assembling the races with the other parts of the bearing.

In Japanese patent publication No. Toku Kai Hei 6-173958, it is proposed that composite electrolytic polishing or composite chemical polishing be performed for the surface of a punched-out retainer. However, it does not mention performing electrochemical processing or chemical processing of races. Also, this same publication does not consider at all very small burrs on the machined surface of races, such as are considered in this invention. The technology of this same publication is totally incapable of reduction of contamination as is obtained by this invention.

In Japanese patent publication No. Toku Hyo 2000-511267, performing electrochemical processing of races is proposed. However, the technology used in the same publication is related to the shape of the electrode and is completely different from this invention. This same publication does not mention and is not related to performing electrochemical processing on the races after super-finishing of the races. Also, with the technology of this same publication, it is not possible to form a surface layer over the entire races by electrochemically or chemically dissolving the machined surfaces of the races.

The rolling bearing of this invention is most suitable for use in information-pressing devices such as a HDD or in rotating parts in artificial satellites. Some examples of rotating parts in artificial satellites include: flywheels, expansion mechanisms and motor for solar-battery paddles, antenna expansion mechanisms, actuators for docking mechanisms, and robot arm manipulators, radiometer, switches, etc.

A feature of this invention in the case of a rolling-bearing unit comprising a rotating shaft of a flywheel for attitude control of an artificial satellite and a rolling bearing provided for supporting the rotating shaft and having races formed with a raceway and rolling elements formed with rolling surfaces, wherein a machined surface is formed on at least the raceway of the races and a surface layer is formed on the machined surface by electrochemically or chemically dissolving the machined surface.

The preferred embodiments of the invention will be explained based on the drawings. FIG. 1 shows a first embodiment of the rolling bearing (angular ball bearing) 10 comprising an inner race 11, outer race 12, a plurality of balls 13 that are located between the inner and outer races 11, 12, and a retainer 14 for holding balls 13 at uniform intervals around in the circumferential direction. The inner and outer races 11, 12 and the balls 13 are made of martensite stainless steel (SUS440C) or the like. A groove 15 that functions as the inner-ring raceway is formed on the outer peripheral surface of the inner race 11, and a groove 16 that functions as the outer-ring raceway is formed on the inner peripheral surface of the outer race 12.

Figure 5:
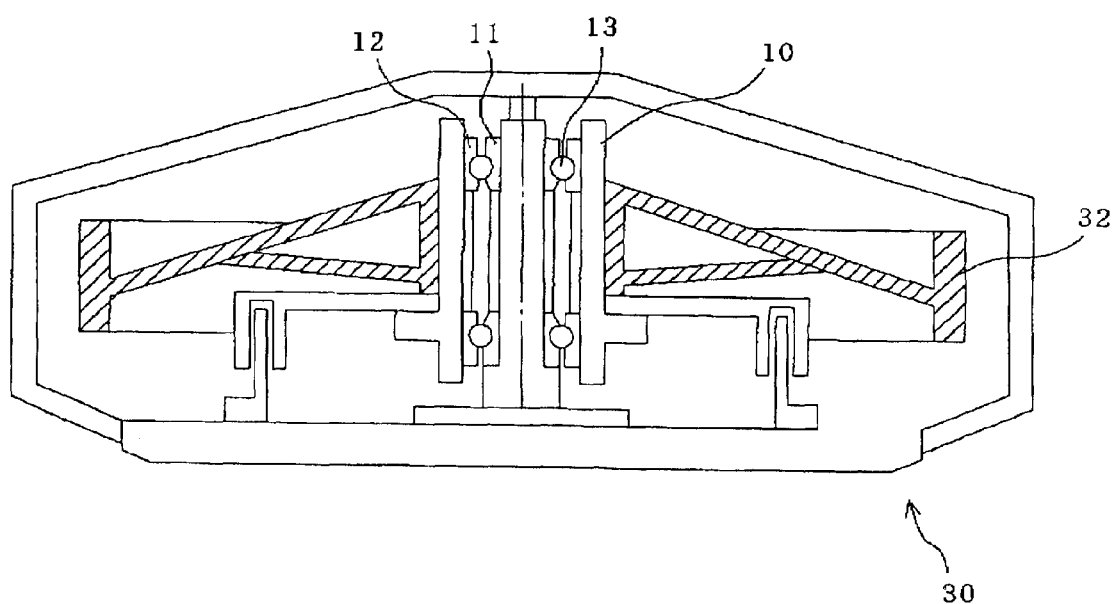
FIG. 5 illustrates a flywheel including a rolling bearing of the present invention.

This embodiment is directed to a rolling bearing 10 to be combined with a flywheel 32 in a flywheel assembly 30 for attitude control of an artificial satellite as shown in FIG. 5.

In order to control the attitude of an artificial satellite, a method of installing a flywheel 32 as shown in FIG. 5 in the satellite, and applying a reaction torque to the satellite by changing the rotational angular velocity of the flywheel 32 is used. For the rolling bearing 10 of the flywheel 32 for controlling the attitude of an artificial satellite, in addition to resistance to wear and low generation of dust in a vacuum, low torque, keeping change in torque to a minimum, and long life are also desired. In order to meet these requirements, there is a need to stably supply a minimum amount of lubrication oil to the bearing.

In this kind of rolling bearing 10, during the time before the lubrication is supplied from an external lubrication oil source to the bearing, lubrication is performed by a very small amount of lubrication oil. However, during this time, wear occurs to the raceway surfaces and the rolling surfaces. Even for small amounts of wear, that wear spreads and contamination occurs after long periods of operation in the special environment of space, making it difficult to maintain the function of the rolling bearing.

However, in this embodiment, the entire surfaces of the inner races 11 and outer races 12 are machined, specifically super-finished, and surface layers 11a, 12a are formed over the entire super-finished surfaces of the inner race 11 and outer race 12 by electrochemically or chemically dissolving the super-finished surfaces, so very little contamination occurs.

By electrochemically or chemically processing the machined, specifically super-finished surfaces, it is possible to completely remove minute grinding-burrs, super-finish burrs (reef) and sticked abrasive. In doing so, it is possible to do away with burrs and reefs falling as the balls 13 roll, and thus it is also possible to prevent the occurrence of stamp-shaped indents.

Moreover, by performing electrochemical or chemical processing in this way, it is possible to do away with unevenness of the machined surfaces and create a surface with very small roughness. It is difficult for minute particles to adhere to surfaces with very small roughness, so it is possible to easily remove by washing any adhering minute particles. This also makes it possible to do away with any minute particles from being brought inside the bearing during bearing assembly.

Figure 2:
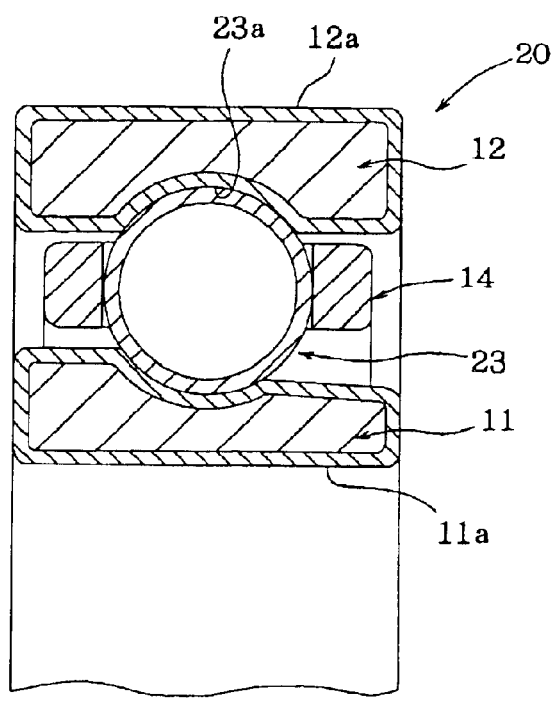
FIG. 2 is a cross sectional view to show part of a bearing in a second embodiment of the present invention.

FIG. 2 shows the rolling bearing 20 of a second embodiment of the invention. In this embodiment, in addition to forming surface layers 11a, 12a over the entire surfaces of the inner race 11 and outer race 12 by machining the entire surfaces and then electrochemically or chemically dissolving the machined surfaces, surface layers 23a are also formed over the entire surfaces of the balls 23 by machining the entire surfaces and then electrochemically or chemically dissolving the machined surfaces.

Next, the procedure for manufacturing the rolling bearing of this invention will be explained based on FIG. 3(A) which shows the manufacturing procedure for the rolling bearing of this invention. FIG. 3(B) shows the manufacturing procedure for a conventional rolling bearing.

Figure 3A:
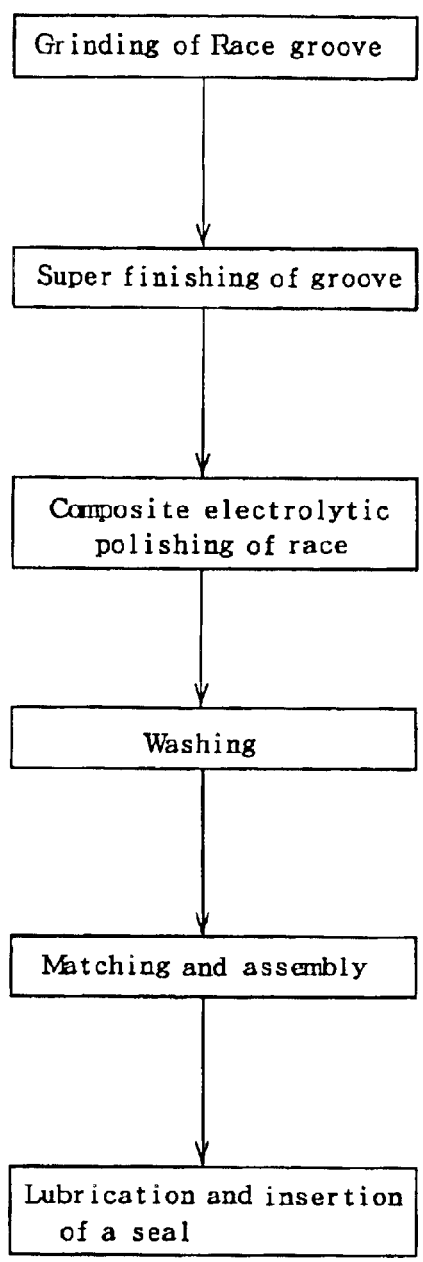
FIG. 3(A) and FIG. 3(B) are a flow chart to explain the production steps of the present invention.
Figure 3B:
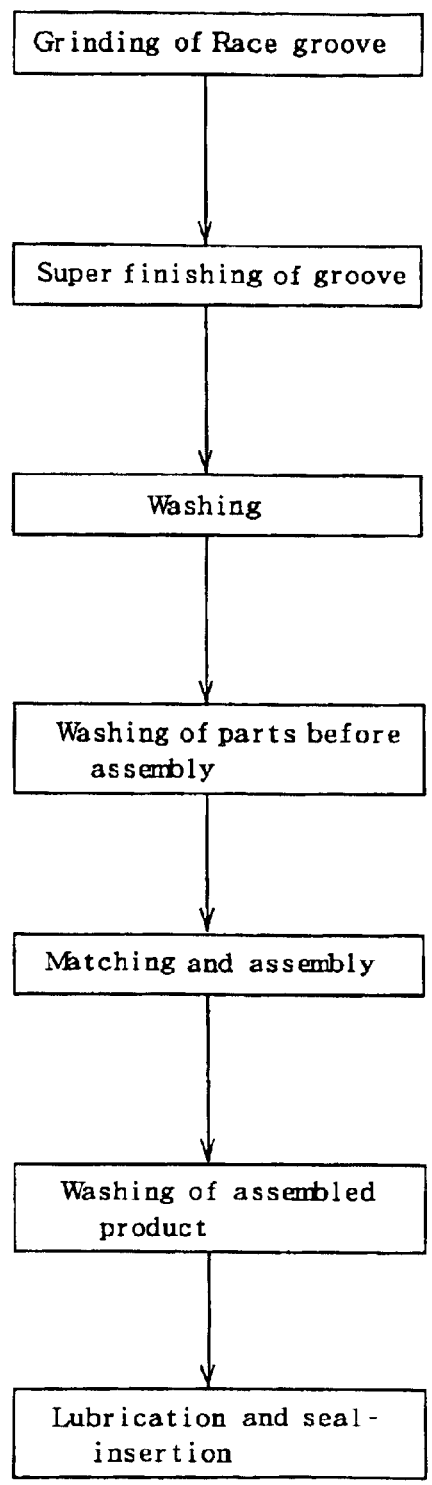

As shown in FIG. 3(A), in the manufacturing procedure of this invention, composite electrolytic polishing is performed after super-finishing has been performed on the grooves. It is preferable that oil be removed using acetone or the like before performing composite electrolytic polishing. Even when there is a retaining period between the super-finishing process and composite electrolytic polishing process, there is no need for special care such as immersion-storing the races (work) in order to prevent them from drying. In the composite electrolytic polishing process, composite electrolytic polishing is performed for the entire surfaces of the inner and outer races, that is the outer-diameter surface, inner-diameter surface, raceway surfaces, seal groove, and all chamfered sections. When doing this, it is preferred that the roughness of the processed surfaces Rmax be 0.3 $\mu$m or less.

After composite electrolytic polishing, light washing is performed using supersonic washing with pure water in order to remove the electrolyte and minute particles. It is very difficult for particles to adhere to the surfaces for which the composite electrolytic polishing process is performed, and since removal of such particles is simple, the washing time can be reduced to about $\frac{1}{5}$ to $\frac{1}{10}$ that in the conventional process in which the races are washed before assembly.

Furthermore, since very few particles adhere to the surfaces and there is very little contamination inside the bearing after the bearing is assembled, there is no need for washing after matching and assembly and it is possible to proceed as is to the process for applying lubrication oil.

In the conventional process shown in FIG. 3(B), immediately after super-finishing of the grooves, brush washing and supersonic washing is performed to remove the grinding fluid and grinding residue. Furthermore, in order to keep particles from getting inside the bearing, the races were repeatedly washed with supersonic washing before matching and assembly. Then, the assembled bearing is carefully washed again before proceeding to the process for applying lubrication oil.

As can be seen from the above explanation, in the manufacturing procedure of this invention shown in FIG. 3(A), the washing process is greatly simplified.

EXAMPLE

A bearing outer race made of SUS440C was prepared and composite electrolytic polishing was performed for it. After a suitable amount of particles were made to adhere to the surface, the outer race was washed. Washing was performed by immersing the outer race in a clean solution and then irradiating it with supersonic waves. After each specified interval of supersonic irradiation, the particles having a size of 1 μm or greater and that were released into the solution were counted by a particle counter in the solution. The surface roughness Rmax of the outer race for which the composite electrolytic polishing process was performed was 0.3 μm for the inner-diameter surface and outer-diameter surface, and 0.27 μm for the end surfaces.

As a comparison, a bearing outer race made of SUS440C was prepared without composite electrolytic polishing performed for it. After a suitable amount of particles were made to adhere to the surface, the outer race was washed and the particles were counted. The surface roughness Rmax of the outer race, for which composite electrolytic polishing was not performed, was 0.9 μm for the inner-diameter surface and outer-diameter surface, and 0.5 μm for the end surfaces.

Figure 4:
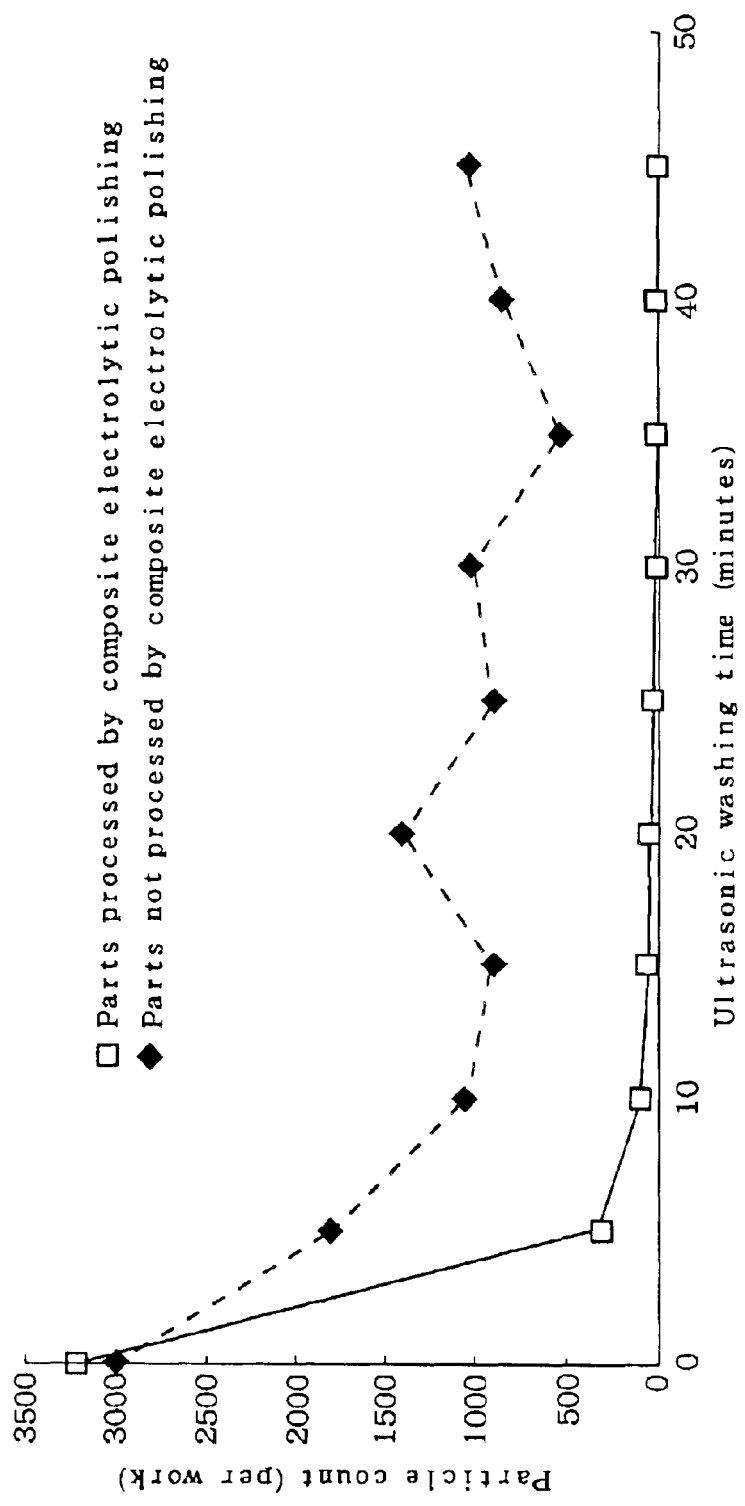
FIG. 4 is a graph to compare an example of the present invention with a comparative example.

The results of particle counting are shown in FIG. 4.

As can be clearly seen from FIG. 4, for the parts that were processed with composite electrolytic polishing, the particle count was reduced in a short time, and after approximately 15 minutes, the number of particles is reduced nearly to that in the solution itself and the particles adhering to the outer race were removed. On the other hand, for parts that were not processed with composite electrolytic polishing, it was not possible to remove part of the particles from the outer race even after continuous washing for a long period of time.

For parts that were not processed with composite electrolytic polishing, not only was it difficult to remove the particles, but also particles that were removed once adhered again to the surface, so particles in the solution increased and decreased, and it was not possible to reduce the number of particles. On the other hand, for that were processed with composite electrolytic polishing, particles were easy to remove and it was difficult for particles that had once been removed from the surface to adhere again, so it was possible to reduce the number of particles in a short time.

The present invention is not limited to the embodiments and examples described above and can be changed and improved as suitable. For example, it is possible to combine the rolling bearing of this invention to form a combination bearing. Also, the technological concept of this invention can be applied to all parts of the bearing unit in addition to the races and rolling elements.

As described above, with this invention it is possible to provide a rolling bearing for which contamination is greatly reduced.

What is claimed is:

1. A rolling bearing comprising races having a raceway, and rolling elements having a rolling contact surface, at least he raceway of the races having a super-finished surface in which a surface layer is formed by electrochemically or chemically dissolving the super-finished surface.

2. A rolling-bearing unit comprising a rotating shaft of a flywheel for attitude control of an artificial satellite and a rolling bearing provided for supporting the rotating shaft and having races formed with a raceway and rolling elements formed with a rolling contact surface, at least the raceway of the races having a super-finished surface in which a surface layer is formed by electrochemically or chemically dissolving the super-finished surface.

* * * * *